United States Patent

Nakai

[11] Patent Number: 6,071,047
[45] Date of Patent: Jun. 6, 2000

[54] METHOD AND APPARATUS FOR FEEDING COOLANT LIQUID AND SEPARATING AND RECOVERING IT IN CUTTING MACHINE AND GRINDING MACHINE

[75] Inventor: Yoshikazu Nakai, Sakai, Japan

[73] Assignee: Zeta Heiwa Ltd., Japan

[21] Appl. No.: 08/945,291

[22] PCT Filed: Feb. 12, 1997

[86] PCT No.: PCT/JP97/00373

§ 371 Date: Oct. 14, 1997

§ 102(e) Date: Oct. 14, 1997

[87] PCT Pub. No.: WO97/29882

PCT Pub. Date: Aug. 21, 1997

[30] Foreign Application Priority Data

Feb. 15, 1996 [JP] Japan .................................. 8-065077
Aug. 23, 1996 [JP] Japan .................................. 8-260086

[51] Int. Cl.⁷ .................................................. B23Q 11/10
[52] U.S. Cl. .................................. 409/131; 29/DIG. 50; 29/DIG. 77; 82/1.11; 82/901; 210/168; 210/171; 407/11; 408/56; 408/61; 409/136; 409/137; 451/449
[58] Field of Search .............................. 407/11; 408/1 R, 408/56, 61, 67; 451/449, 453; 82/1.11, 901; 29/DIG. 50, DIG. 61, DIG. 63, DIG. 77, DIG. 88, DIG. 91; 210/168, 171, 255; 222/80, 566, 630; 239/548, 565; 409/131, 135, 136, 137

[56] References Cited

U.S. PATENT DOCUMENTS

| | | | |
|---|---|---|---|
| 2,837,972 | 6/1958 | Knowles | 409/136 |
| 3,605,551 | 9/1971 | Stewert | 407/11 |
| 3,868,195 | 2/1975 | Anderson et al. | 408/61 |
| 4,325,663 | 4/1982 | Lee | 409/136 |
| 4,733,999 | 3/1988 | Kitamura | 409/136 |
| 4,946,322 | 8/1990 | Colligan | 409/137 |
| 5,245,152 | 9/1993 | McCall | 409/137 |
| 5,458,770 | 10/1995 | Fentz | 210/168 |
| 5,800,104 | 9/1998 | Miyano | 409/136 |

FOREIGN PATENT DOCUMENTS

| | | | |
|---|---|---|---|
| 4646 | 1/1986 | Japan | 409/137 |
| 63-13203 | 1/1988 | Japan . | |
| 64-38236 | 3/1989 | Japan . | |
| 87752 | 3/1992 | Japan | 409/137 |
| 5-104393 | 4/1993 | Japan . | |
| 6-000641 | 1/1994 | Japan . | |
| 7-000634 | 1/1995 | Japan . | |
| 7-51981 | 2/1995 | Japan . | |
| 7-25007 | 3/1995 | Japan . | |
| 7-88742 | 4/1995 | Japan . | |

*Primary Examiner*—Daniel W. Howell
*Attorney, Agent, or Firm*—Morgan & Finnegan, LLP

[57] ABSTRACT

A coolant liquid feeding method comprises feeding a coolant liquid, with air bubbles caused to form continuously therein, for cutting or grinding operation to a region under machining, expediting the splashing of air bubbles in all directions when the air bubbles impinge on the region under machining and burst, and also expediting the entry of accelerated splashed liquid particles into a cutter/workpiece pressure contact plane, thereby improving the cooling and lubrication of the region under machining, whereby the air bubbles in the coolant liquid which has failed to reach the region under machining or which, though reaching there, has left there for the recovery channel are allowed to adhere to suspended foreign matters in the liquid, thereby expediting the surfacing of the foreign matters. The coolant liquid is discharged downward generally as a spiral flow which is a collection of particulate turbulent flows, thereby forming a cylindrical veil of coolant liquid which surrounds the milling tool or grinding tool and whose lower end reaches the surface of the workpiece, at least part of the spiral flow being caused to move from the lower end of the cylindrical veil along the surface of the workpiece in a whirl toward the central region until it is fed to the region under machining which is in contact with the milling tool or grinding tool.

10 Claims, 16 Drawing Sheets

METHOD AND APPARATUS FOR FEEDING COOLANT LIQUID AND SEPARATING AND RECOVERING IT IN CUTTING MACHINE AND GRINDING MACHINE

TECHNICAL FIELD

The present invention relates to a method and apparatus for feeding a coolant liquid and separating and recovering it in a cutting machine and a grinding machine, particularly a method and apparatus for feeding a flow of coolant liquid to a region of contact between a cutter or the like and a workpiece and it also relates to a method and apparatus for automatically separating and recovering the coolant liquid subsequent to the supply thereof.

BACKGROUND ART

In machining, the factor which plays a major role in shortening the processing time and minimizing the strain due to processing is to enhance contact lubrication between a cutting tool or grinding tool and a workpiece and promote dissipation of heat of friction or cooling. That is, from the standpoint that the cutting conditions can be improved by slightly weakening the surface layer, if the coolant liquid is allowed to flow in all directions into the main cutting shear region and to be adsorbed by the created macroscopic cracks or voids, this results in lowering the surface energy and preventing re-adhesion. Such effect of brittleness in the shear region is very useful in providing an increased shear angle and a decrease in the thickness of chips and also in the cutting force. On the other hand, since tools transiently create a field of plastic deformation and shear in the surface of a workpiece, it is of utmost importance that effective cooling and lubrication be effected for each transient field of plastic deformation and shear with which the tool comes in contact.

However, in conventional machine tools, a coolant liquid fed directly to such transient field (tool contact region) through a nozzle is flung away by the rotation of the tool or workpiece and only superficially passes along the tool and workpiece surfaces; therefore, it can hardly be said that the coolant liquid contributes to effective cooling and lubrication.

SUMMARY OF THE INVENTION

In order to ensure that a coolant liquid in machine tools finds its way to a tool/workpiece contact region in a film-formed flow with desirable fluidity against the centrifugal force from a rotating surface and satisfactorily enters the shear region, I have experimentally created phase conditions of various coolant liquids for investigation.

As a result, I have found that continuous mixing of air in a coolant liquid decreases the liquid phase mass, thereby making it difficult for the liquid coolant to be flung away because of the decreased centrifugal force when impinging on a rotating body adjacent the tool contact region, that of the liquid particles which are splashed in all directions upon the bursting of air bubbles, those which are heading for the tool contact region also enter the narrow shear region, thereby providing improved lubrication, and that the remaining air bubbles adhere to foreign matters, such as chips, to enhance the fluidity and buoyancy thereof, thereby contributing to the separation and recovery of the coolant liquid.

Accordingly, an aspect of the present invention provides a method for feeding a coolant liquid to a cutting machine or grinding machine, which is characterized by feeding a coolant liquid, with bubbles caused to form continuously therein, for cutting or grinding operation to a region under machining, expediting the splashing of air bubbles in all directions when the air bubbles impinge on the region under machining and burst, and also expediting the entry of accelerated splashed liquid particles into a cutter/workpiece pressure contact plane, thereby improving the cooling and lubrication of said region under machining, whereby the air bubbles in the coolant liquid which has failed to reach the region under machining or which, though reaching there, has left there for the recovery channel are allowed to adhere to suspended foreign matters in said liquid, thereby expediting the surfacing of the foreign matters.

Then, in order to allow the coolant liquid to be affluently fed to the region under machining, I have tried, not to directly spout it against the region under machining from a nozzle, but to feed it there in the form of a flow. A nozzle for this purpose is designed to spout the coolant liquid against a non-rotating circumferential region surrounding the region under machining. And I have found that in the interior of the nozzle, there is formed a particulate turbulent flow of coolant liquid and that by imparting a spiral rotation thereto, the coolant liquid which reaches the circumferential region moves, as if crawling in a whirl, to the central region including the rotating tool.

Therefore, another aspect of the invention provides a method for feeding a coolant liquid to a cutting machine or grinding machine, which is characterized by installing an annular nozzle for coolant liquid above a milling tool or grinding tool connected to a vertical main spindle so that it faces downward at a substantially coaxial position, the inner wall of said nozzle which extends to its discharge port being formed with a curved surface and a twist channel for producing a turbulent flow, whereby the coolant liquid being fed is discharged downward through said discharge port generally as a spiral flow which is a collection of particulate turbulent flows, thereby forming a cylindrical veil of spiral flow of coolant liquid which surrounds said milling tool or grinding tool and whose lower end reaches the surface of the workpiece, at least a part of said spiral flow being caused to move from the lower end of said cylindrical veil along the surface of the workpiece in a whirl toward the central region until it is fed to the region under machining which is in contact with the milling tool or grinding tool, the at least a part of said spiral flow being discharged outside said cylindrical veil together with chips and heat of friction and diffused along the workpiece surface.

In the above arrangement, the cylindrical veil of coolant liquid itself contributes to the formation of said whirling surface flow and also serves for prevention of environmental pollution by enclosing the smoke from the scorching of oil and oil films on the workpiece surface due to cutting. Of course, it is apparent that if air bubbles are caused to form in the coolant liquid being fed to said cylindrical nozzle, the effect of the whirling flow feeding a coolant liquid to the region under machining and the above-described effect brought about by air bubbles can be concurrently developed.

The nozzle construction invented in order to use said coolant liquid feeding method forms an annular nozzle for downwardly discharging coolant liquid adapted to be installed above and coaxial with a milling tool or grinding tool connected to a vertical main spindle, said nozzle comprising:

a) an inlet annulus defining an annular inlet chamber,
  b) a channel annulus disposed axially adjacent said annular inlet chamber, including at least two introducing passages communicating with said inlet chamber at axisymmetrical positions, outward or inward twist channels respectively communicating with said introducing passages and twisted in a unified direction, and annular turbulent flow forming portions communicating with the terminal ends of said twist channels, and c) nozzle annulus communicating with all annular area of said turbulent flow forming portions in said channel annulus and defining an annular nozzle space which opens in a downward and inward or outward direction, d) wherein the channel wall extending from said turbulent flow forming portions in said channel annulus to said nozzle space is formed with at least one bent surface radially bent back for formation of turbulent flow,. whereby the coolant liquid fed is discharged from said nozzle space generally as a spiral flow which is a collection of particulate turbulent flows, forming a substantially cylindrical veil which consists of said spiral flow and which surrounds said milling tool or grinding tool.

Further, I have taken notice of the fact that effective recycle feeding of a coolant liquid, that is, constructing a system for reliably separating foreign matters, such as chips and grinding stone fragments, and a migrating oil content from a coolant liquid recovered after being fed to a region under machining in the ordinary recycle process is a great factor which minimizes the downtime of the machine involved in cleaning the channels, exchanging liquid or re-supplying additive agents (rust preventive agent, lubricant, etc.) and which ensures smooth effective feeding of coolant liquid, leading to my inventing a separating and recovering device which is used in conjunction with said method of mixing air bubbles in a coolant liquid.

Therefore, another aspect of the invention is to provide a separating and recovering apparatus for coolant liquid in a cutting machine or grinding machine for collecting a coolant liquid fed to a region under machining and separating impurities therefrom and then discharging it, said separating and recovering device comprising;

a) an inflow tank for receiving a coolant liquid after the latter has been used;

b) a row of sleeve communicated tanks comprising at least one set of two connected tanks disposed downstream of—or incorpolating therein said inflow tank, wherein a sleeve bundle having a substantially honeycomb-like cross section and extending through a partition wall between said two connected tanks is disposed extending from the upstream tank to the downstream tank and facing somewhat upward, c) a row of opening communicated tanks comprising at least one set of two connected tanks disposed downstream of—or incorporating therein said inflow tank, wherein a communication port formed in a partition wall between said two connected tanks has a lower end edge disposed at a slightly higher level than that of the tank bottom and an upper end edge disposed at a lower level than the normal liquid level set to the final overflow level;

d) an outflow tank which is a final tank connected through said sleeve bundle or said opening to the rear end tank in a plurality of series connected tanks comprising a combination of said sleeve communicated tank row and said opening communicated tank row, said outflow tank having an overflow port for discharging the separated and recovered coolant liquid at said final overflow level, e) a foreign matter separating roller including a rotatable roller having a horizontal axis installed in at least one of the plurality of tanks ranging from said inflow tank to said outflow tank, said roller being partially immersed in the coolant liquid in the at least one tank and combined with a deposit scraping blade having a front edge opposed to the portion of the roller surface exposed above the liquid level, with a very narrow clearance defined between the exposed portion of the roller surface and said blade, f) the upward slope of said sleeve bundle being such that masses of air bubbles, having foreign matters such as chips adhering thereto, in the coolant liquid flowing from the low-level inlet in said sleeve bundle in the upstream tank are caused by the action of buoyancy to abut against the respective ceiling surfaces of the sleeves and while these masses of air bubbles are staying in the sleeves, they are integrated with subsequent masses to become increased in size, whereby said masses are pushed by the liquid flowing into the sleeves to move to the high-level outlet in the ceiling surface, said masses being discharged from said outlet into the coolant liquid phase in the downstream tank and finally surfacing.

In the above arrangement, the separation of solid fine particles is effected normally without using a large-scale device such as a centrifugal separator, and since filter means such as a paper filter is not used, there is no danger of the additive agents in the coolant liquid being removed owing to filter clogging caused by the oil content. The reason for the foreign matter scraping blade being opposed to the roller with a narrow clearance therebetween is to allow the oil content to deposit on the peripheral roller surface to form a deposited layer of oil content (substrate) having a thickness corresponding to said narrow clearance and thence forth allow an oil film of air bubbles adhering to chips and the like to be implanted on said substrate with ease so as to form, as it were, a colony of the same substance. Therefore, implanted foreign matters formed as every portion of the peripheral roller surface passes through the top layer of the coolant liquid is scraped by the blade as they come out above the liquid surface and reach the blade.

I have also found that when a turbulent flow of finely divided coolant liquid containing air bubbles is spouted with a substantially rectangular cross section to impinge from above the rotating peripheral surface connected to the machining portion of a lathe on a region axially extending at least to said region under machining, the film of turbulent flow moves toward the tool/workpiece contact region as if crawling along the rotating peripheral surface and the cutter.

That is, another aspect of the invention provides a method of feeding a coolant liquid for a lathe, comprising the steps of positioning a nozzle above the work holding chuck of the lathe, said nozzle including a discharge port of substantially rectangular cross section and a constricted curved surface portion on its inner wall extending to said discharge port for producing a turbulent flow, and also including a loosely mounted tongue piece of rigid or elastic material crossing the section of said discharge port and projecting outward, whereby said nozzle is arranged such that a coolant liquid received through the inlet disposed upstream of said constricted curved surface portion is discharged from said discharge port as a collection of particulate turbulent flows containing air bubbles drawn into the coolant liquid as the latter passes by said tongue piece, said cross section of the discharge port of said substantially rectangular section being disposed substantially orthogonal to the plane containing the main axis of the lathe and facing obliquely downward deviated in the direction in which the workpiece projects, whereby the coolant liquid discharged from said nozzle is caused to impinge on a region axially extending from the top of the peripheral surface of said chuck to at least the region under machining, so as to form a turbulent flow film of coolant liquid containing air bubbles surrounding the chuck and the peripheral surface of the workpiece, at least part of said turbulent flow containing air bubble being caused to move along the chuck surface and workpiece surface so as to be fed to the region under machining which is in contact with the cutter and then flow out toward the coolant liquid recovery channel together with chips and heat of friction.

The arrangement of the coolant liquid feeding nozzle invented to be used with said method of feeding a coolant liquid for a lathe comprises;

at least one nozzle having a discharge port of substantially rectangular section and having a tongue piece of rigid or elastic material crossing the section of said discharge port and projecting outside, said tongue piece being loosely mounted in said discharge port; and a main body having a feed chamber communicating with said at least one nozzle, and a coolant receiving inlet in said feed chamber, the inner wall of the feed chamber extending from said receiving port to said discharge port and the inner wall of the nozzle being formed with a cons-rioted curved surface portion, whereby the coolant liquid received from said receiving port is discharge from said discharge port as a collection of particulate turbulent flows containing air bubbles drawn into the coolant liquid as the latter passes by said tongue piece, the discharge flow of this coolant liquid being cause to impinge on the rotating peripheral surface continuous with the region under machining which is in contact with the cutter and also impinge on the cutter to form a turbulent flow film containing air bubbles, at least part of said turbulent flow film containing air bubbles moving along the rotating peripheral surface and cutter until it is fed to said region under machining.

BEST MODE FOR EMBODYING THE INVENTION

Figure 1:
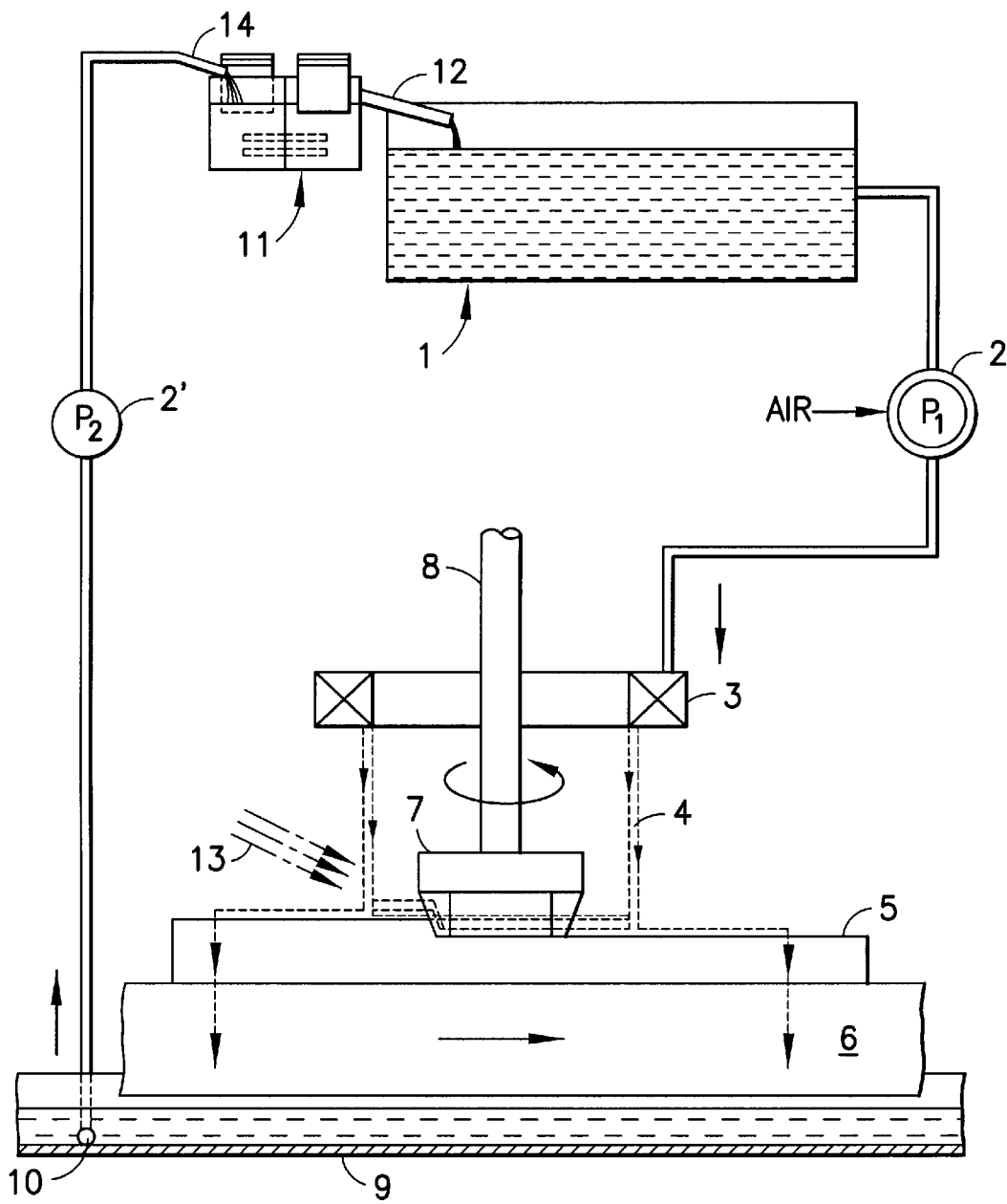
FIG. 1 is a diagrammatic view showing the basic constructional principle of the coolant liquid feeding system of the present invention.

In FIG. 1 showing the basic system construction of the present invention, the numeral 1 denotes a main tank of large capacity for storing coolant liquid; 2 denotes a coolant pump (P1) which, in this case, is used to take in air to cause air bubbles to form in a coolant liquid and feed the liquid to an annular nozzle 3. The annular nozzle 3, as will be later described in more detail, is used to downwardly spout the coolant liquid fed from the pump P1 as a cylindrical veil 4 generally consisting of a spiral flow which is a collection of particulate turbulent flows to impinge on the surface of a workpiece 5. The workpiece 5 is cut on a movable table 6 by a milling tool 7 which, in this case, is a fullback cutter, and a main spindle 8 supporting the milling tool 7 passes through the annular nozzle 3. Most of the cylindrical veil 4 of coolant liquid, at its lower end impinging on the workpiece surface, moves as a whirling surface flow toward the center to be affluently fed to the place of contact between the cutting edge of the milling tool 7 and the workpiece 5. After having been thus fed to the workpiece, the coolant liquid discharged outside the cylindrical veil 4 sinusoidally each time its mound increases travels, together with the portion of the coolant liquid which has initially been directed outward, via the workpiece 5 and a movable table 6 to flow down, in this case, into a gutter-like outer peripheral pan 9, and is drawn up by a second coolant pump 2' (P2) through a suction port 10, finally reaching a separating and recovering tank 11. In the separating and recovering tank 11 to be later described in more detail, the coolant liquid after having the foreign matters, such as oil and chips, removed therefrom, is returned to said large-capacity tank 1 through a filling port 12.

In the above example of the basic construction, the coolant liquid supplied as a cylindrical veil 4 preferably contains lots of air bubbles due to the air take-in action of the coolant pump 2. Therefore, the coolant liquid containing lots of air bubbles which is fed to the region of contact between the milling tool 7 and the workpiece 5 undergoes centrifugal force from the rotation of the tool to a less degree due to its lower mass, a fact which makes it easier for the coolant liquid to penetrate into the tool/workpiece contact region. And in this case the splashed liquid created upon the bursting of air bubbles easily enter into the fine cracks by the action of acceleration. Further, this arrangement is also superior in dissipation of heat due to bursting, and the lubricating action and heat dissipating action thereof, as described above, enhance the cutting performance of the tool and make it possible to use a sintered carbide tool to effect cutting with high feed rate. Of course, the cutting heat is continuously carried away by the flow of coolant liquid discharged from the region under machining. The effect of feeding such air bubble-containing coolant liquid is attained not only by the system of the present invention forming a whirling flow through the cylindrical veil 4 but also by a direct nozzle jet flow 13 to the cutting point as has heretofore been practiced. Further, the operation for causing air bubbles to form in a coolant liquid is effected by the air take-in action of the pump 2, as described above, but besides this, it can also be effected, e.g., by making sufficiently high the head between the recovery pipe pouring port 14 and the liquid level of the tank 11 and the head between the filling port 12 at the outlet of the separating and recovering tank 11 and the liquid level of the large-capacity tank 1 to produce a pouring impact.

Figure 2:
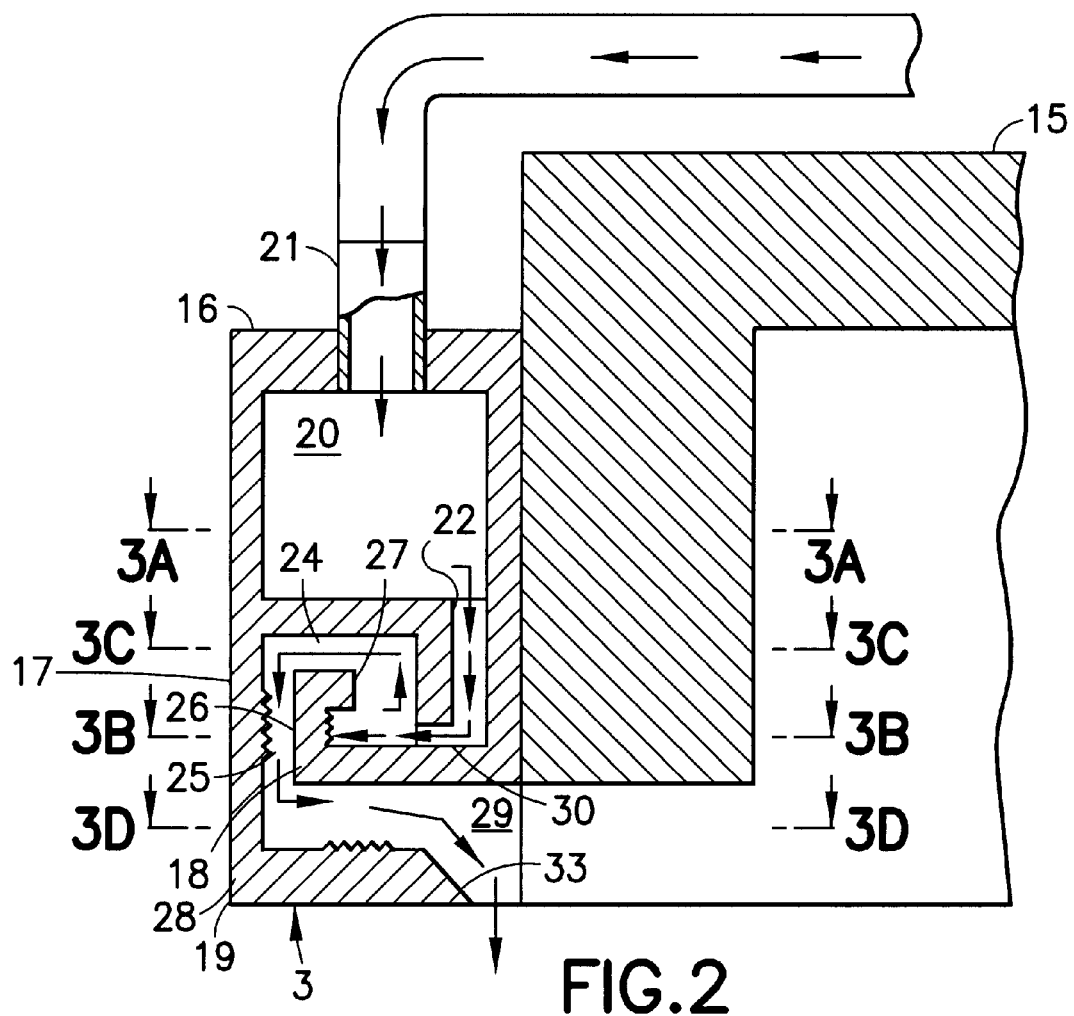
FIG. 2 is a partial sectional view showing the cross-sectional construction of a coolant liquid feeding nozzle used in the basic construction of the invention.

FIG. 2 shows in detail the sectional construction of the annular nozzle 3 for coolant liquid. In this case, the main portion of the inner peripheral surface of the annular nozzle 3 is supported by the outer peripheral surface of a main spindle cover 15. The annular nozzle 3 comprises an inlet annulus 16 at the upper end, an intermediate channel annulus 17, and a nozzle annulus 19. The inlet annulus 16 forms an annular inlet chamber 20 to receive a supply of coolant liquid from the upper inlet 21. The channel annulus 17 is connected to the inlet annulus 16 such that its upper end surface defines the bottom surface of the inlet chamber 20. And at least one, or in this case, 6 coolant liquid introducing passages 22 are defined to extend from the upper and to the lower end, thus defining an outwardly twisted channel 23 twisted in a unified direction of rotation at the lower ends of the introducing passages 22. In the region outside the radial range including the introducing passages 22 and the twist channel 23 in the channel annulus 17, there is a relatively large channel serving as a turbulent flow forming portion 24. The upper surface of the main portion of the bent annulus 18 defines the bottom surfaces of the twist channel 23 and turbulent flow forming portion 24 and, its outer end, at a position where it forms an annular discharge passage 25 between it and the outer peripheral wall of the turbulent flow forming portion 24 defines an upwardly projecting portion 26 and an inwardly turned back portion 27. Therefore, the inward coolant liquid flow twisted in a predetermined direction of rotation from the twist channel 23 impinges on the inner surface of the upwardly projecting portion 26 of the bent annulus and is inwardly turned back, detouring around the inwardly turned back portion 27 to bend outwardly, and finally flowing out as a collection of microscopic whirling flows or tiny turbulent flows downwardly through an annular discharge passage. The nozzle annulus 19 is provided with an inclined floor surface 30 which defines an inwardly and downwardly inclined nozzle space 29 between the outer wall 28 connected to the outer wall of the channel annulus 17 and the lower end surface of the bent annulus 18. Since the front end 31 of the inclined floor surface 30 is sharply inclined downward, it follows that the coolant liquid discharged from the discharge passage thereabove is rotating and that said coolant liquid is discharged mostly as a cylindrical downward spiral flow under its own weight.

Figure 3:
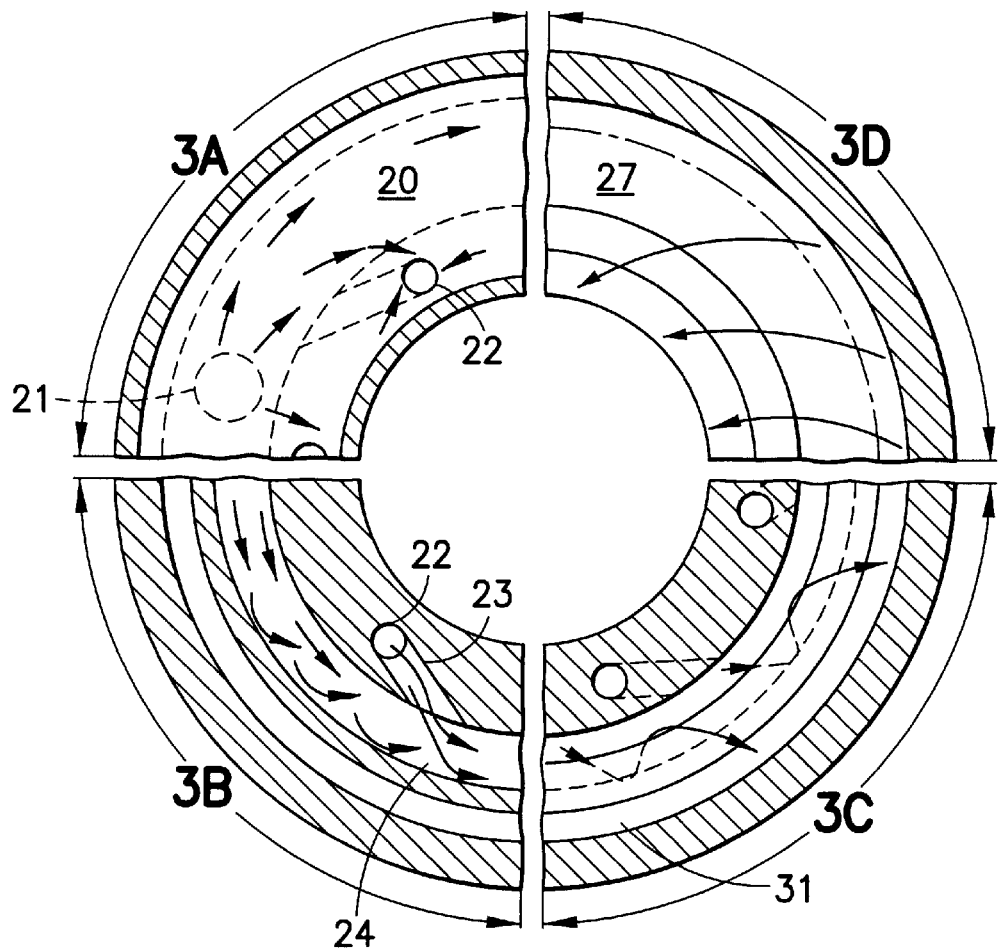
FIG. 3 is a view showing a combination of partial sections taken along the line 3A—3A, 3B—3B, 3C—3C and 3D—3D in the partial sectional view of FIG. 2.

FIG. 3 is a combination of horizontal sections showing in order the flow of coolant liquid in said annular nozzle, wherein first, at 3A, the coolant liquid flowing in through the inlet annulus 21 travels into one vertical introducing passage 22 to flow downward, and the coolant liquid leaving the lower end of said introducing passage 22, as shown in 3B-section, travels through the twist channel 23, entering the turbulent flow forming portion 24 as a counterclockwise flow in this case, and as shown at the section 3C, bends inwardly and outwardly from said turbulent flow forming portion 24 to reach the outer discharge passage 25 connected to the nozzle space 29, from which discharge passage 25, as shown by arrows in the section 3D it travels through the nozzle space 29 until it is discharged as a spiral flow moving inwardly and then downwardly, as will be understood.

Figure 4:
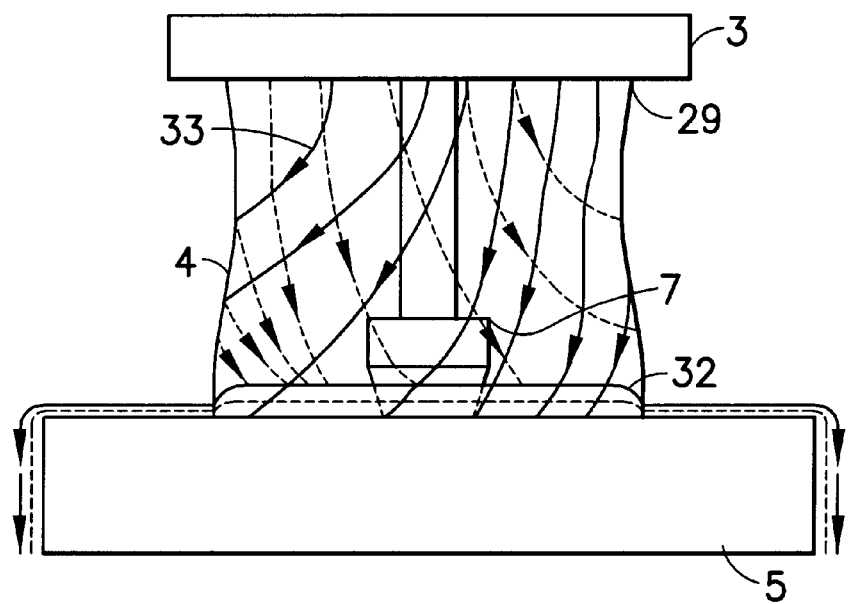
FIG. 4 is a schematic side view showing a cylindrical veil and a whirling surface flow of a coolant liquid coming out of the coolant liquid feeding nozzle shown in FIGS. 1 through 3.
Figure 5:
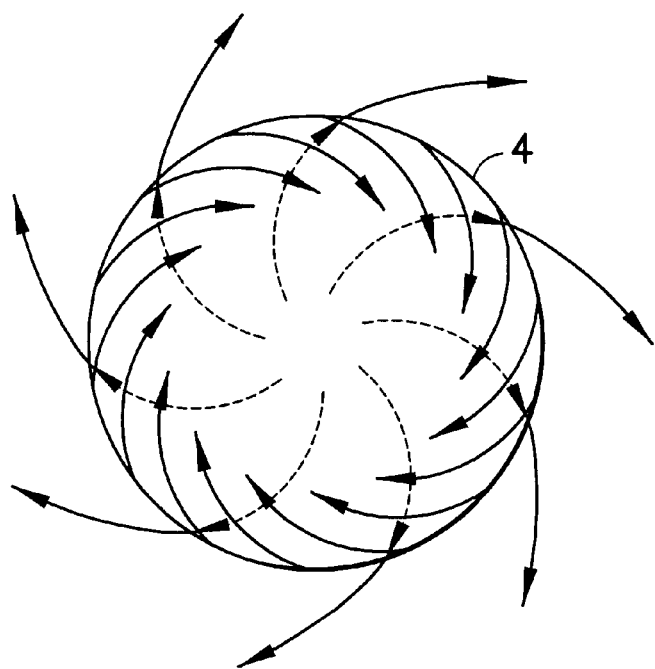
FIG. 5 is a schematic plan ,view showing the cylindrical veil and the whirling surface flow shown in FIG. 4.

FIGS. 4 and 5 are views which show in detail the state of the cylindrical veil 4 and whirling surface flow discharged from the annular nozzle. As shown in FIG. 4, the coolant liquid discharged as the cylindrical veil 4 falls typically in the form of a constricted bell-shaped spiral flow as a result of its self-weight, centrifugal force and rotative speed, and in cases in which it contains a number of air bubbles, it impinges on the surface of the workpiece 5 while assuming a clouding state. Most of the coolant liquid impinging on the surface of the workpiece 5 travels in a whirl in the direction of the spiral rotation toward the center, covering the lower portion of the tool 7, exhibiting a mound as shown at 32 in FIG. 4. Each time the height of the mound increases to a certain level, the coolant liquid sinusoidally flows outside the veil 4; thus, the coolant liquid contributes to the lubrication and cooling of the region of contact between the milling tool 7 and the workpiece 5 while repeating the mounding. It seems that one reason why the coolant liquid impinging on the workpiece surface 5 forms a whirling flow rather than being scattered is that the cylindrical veil is making a spiral or twist rotation as indicated by arrows 33, and another is that the coolant liquid forming a turbulent flow in the annular nozzle results in a flow of fine particles (a mass of turbulent flow) of coolant liquid, which flow runs, as it were, sliding on a coolant liquid film in the form of a similar group of fine particles formed on the workpiece surface. Such state in which the region of contact between the cutting tool and the workpiece is permanently filled with a coolant liquid phase is a phenomenon which has heretofore never been found in the conventional direct spout type nozzle and which greatly improves the lubricating and cooling of the region being cut. And if the coolant liquid contains air bubbles, said lubricating and cooling effects brought about by air bubbles are added, further improving the cutting performance. In cases in which the coolant liquid is maintained relatively clean by using the separating and recovering tank, wet cutting using a coated carbide tool can be effected at as high a rate as 300–700 m/min, which is more than twice the conventional cutting rate of 150–200 m/min. Furthermore, it has been confirmed that since the heat of friction is well dissipated for cooling, the chips are not quenching blue but silver white. Further, even if the coolant liquid is subjected to a shock due to impingement on the workpiece 5 or due to rotation of the tool, mist, if any, will be taken into the running coolant liquid if the spouting pressure is low or medium, thus little influencing the working environment. Further, since almost all heat generated is taken away as the heat of vaporization of water, there is little reduction in the components of the coolant liquid; thus, it follows that the re-supplying of coolant liquid requires only supplying water alone or a coolant liquid of high dilution percentage.

Figure 6:
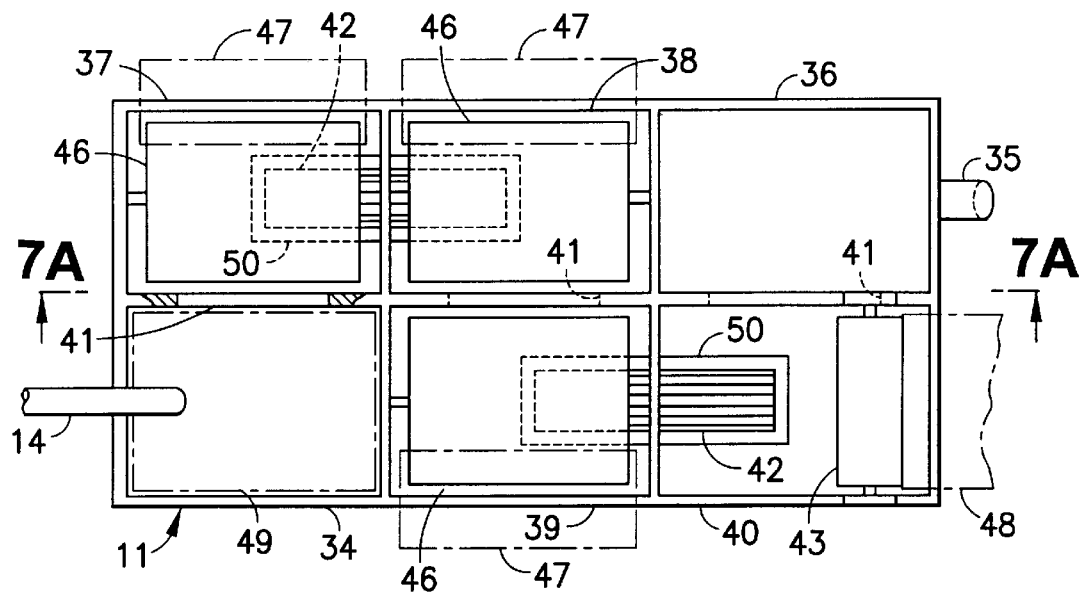
FIG. 6 is a plan view showing a typical embodiment of a separating and recovering tank for coolant liquid.
Figure 7:
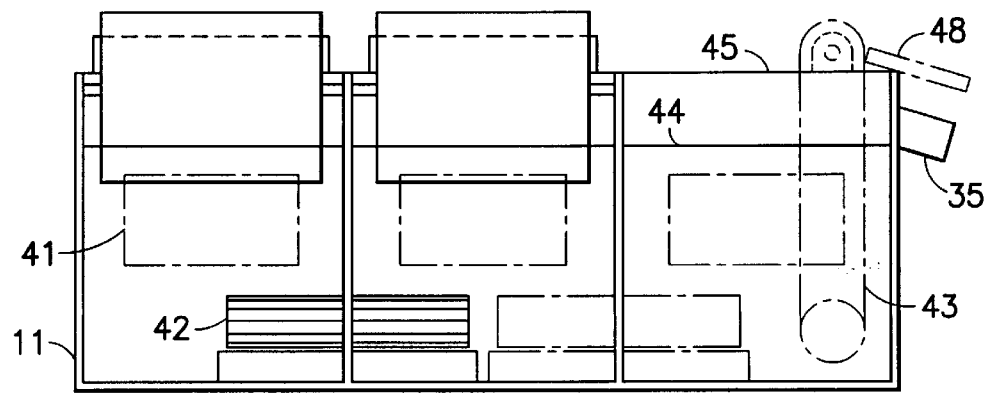
FIG. 7 is a vertical section taken along the line 7A—7A in FIG. 6.
Figure 8:
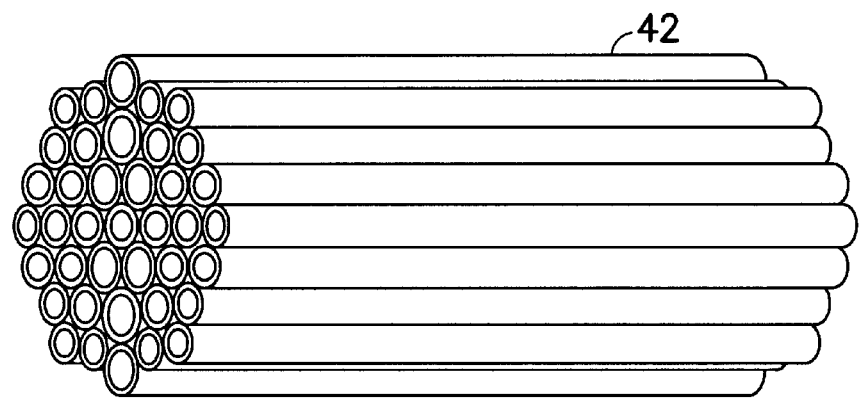
FIG. 8 is a perspective view of a sleeve bundle having a substantially honeycomb-shaped cross section in the separating and recovering tank shown in FIGS. 6 and 7.
Figure 9:
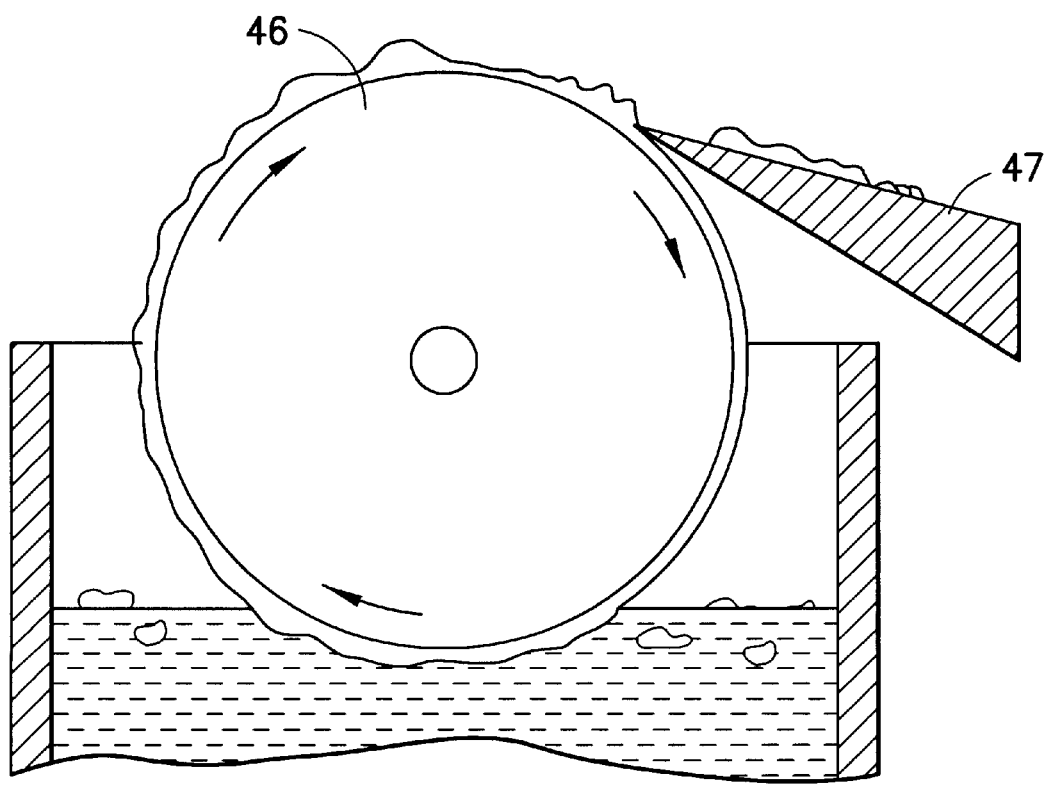
FIG. 9 is a partial sectional view showing a foreign matter separating roller construction comprising a rotatable roller and a blade in the separating and recovering tank shown in FIGS. 6 and 7.

As shown in FIGS. 6 and 7, the separating and recovering tank 11 for the coolant liquid is divided into sections and has a plurality (4 in this case) of sleeve bundle communication tanks 37, 38, 39 and 40 disposed between an inflow tank 34 positioned immediately below the feed port 14 and an outlet tank 36 having a discharge port 35. Between the inlet tank 34 and the first communication tank 37, there is opening communication provided by a communication port 41 having a lower edge disposed slightly above the bottom surface and an upper edge disposed slightly below the final overflow level, and the communication tanks 37 and 38 communicate with each other through a sleeve bundle 42 having a substantially honeycomb-shaped cross section (FIG. 8). The latter communication tank 38 and the next communication tank 39 communicate with each other again through a similar communication port 41, and the communication tank 39 and the next communication tank 40 communicate with each other through a second similar sleeve bundle 42. Further, the final communication tank 40 and the outlet tank 36 communicate with each other through a communication port 41 such as mentioned above. Preferably, in the final communication tank 40, there is a foreign matter arresting belt conveyor 43 having a vertical front at a position opposed to the outlet of the sleeve bundle 42, the upper end of said belt conveyor being above the level of the coolant liquid surface 44 in the tank and also above the level of the upper edge 45 of the tank. Further, disposed in the upper regions of the sleeve bundle-communicated tanks 37, 38 and 39 are foreign matter separating rollers 46 having their lower ends slightly submerged below the coolant liquid surface 44 which is at the normal level. Matter adhering to the peripheral surfaces of the foreign matter separating rollers above the level of the upper edge 45 of the tank and the matter adhering to the upper end region of the belt conveyor 43 are scraped off by blades 47 and 48 shown in phantom lines.

There is a slight clearance between each blade 47 and the upper ends of each roller 46, and an oil film adheres to the surface of the roller 46 until it fills said clearance and an oil film on the surface of an adhering mass of chips and air bubbles easily deposits on the first-mentioned oil film in the form of a flock or colony and is scraped off at the blade position. This remark is applicable also to the relation between the belt conveyor 43 and the blade 48. The ports for communication between the tanks 34 and 37, between the tanks 38 and 39 and between the tanks 40 and 36 serve to check a precipitatedheavy foreign matter and a normally surfacing light-weight foreign matter to prevent them from flowing into the next tank. For example, if a foreign matter reservoir 49 is disposed on the bottom of the inlet tank 34, the sediment can be removed by raising said foreign matter reservoir 49 at a suitable time.

The sleeve bundles 42 disposed to extend through the tandem tanks 37, 38 and 39, 40 are inclined slightly upward from the downstream to the upstream side as shown in FIG. 8, and such that as the coolant liquid proceeds therethrough to the next tank, foreign matters adhering to oil films on the air bubbles and tending to float impinge on the upper surface of the sleeve and stay there, but similar foreign matters impinge on the same in succession and the latter increase in diameter until they are pushed by the liquid flow and driven into the downstream tank, where the foreign matters float on the liquid surface.

The foreign matters surfacing in each tank, as described above, adhere to the oil film on the surface of the roller 46 and are carried to the liquid surface, whereupon they are scraped off by the blade 47. The foreign matters in the coolant liquid discharged from the final sleeve bundle 42 adhere to the vertical surface of the belt conveyor opposed to the outlet end of said sleeve bundle and are thereby raised above the liquid surface and then scraped off by the blade 48. In addition, disposed immediately below each sleeve bundle 42 is a heater 50 positioned on the tank bottom surface, serving as a heat source for reliably removing the adhering foreign matters in the sleeve bundle 42. This utilizes the fact that the viscosity of oil decreases with increasing temperature. Of course, the separating and recovering tank 11 may be heated in its entirety. The arrangement of said separating and recovering tank is shown by way of example only, and it is clear that the number of sleeve bundle-communicated tanks may be increased from the illustrated 4 to 6 or more and that if air bubbles are already present, only two tanks will suffice.

By the use of the separating and recovering tank described above, the coolant liquid being recycled is maintained clean at all times, whereby the cleaning of the large-capacity tank is facilitated, prolonging the renewal period for the coolant liquid. Further, it is clear that since no use of oil adsorbent, paper filter or the like is involved, the arresting cost can be reduced.

Figure 10:
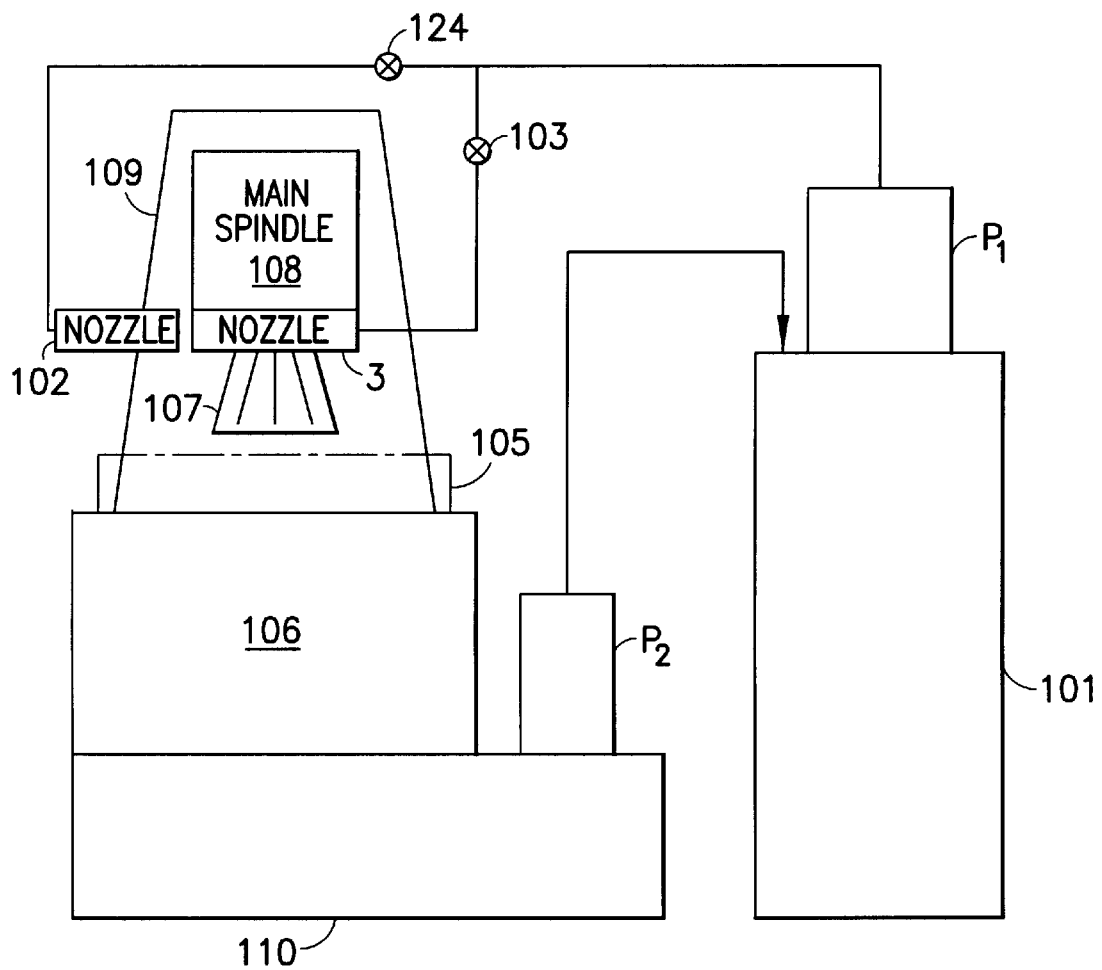
FIG. 10 is a diagrammatic view showing a first installation example embodying the basic constructional principle of the invention.
Figure 11:
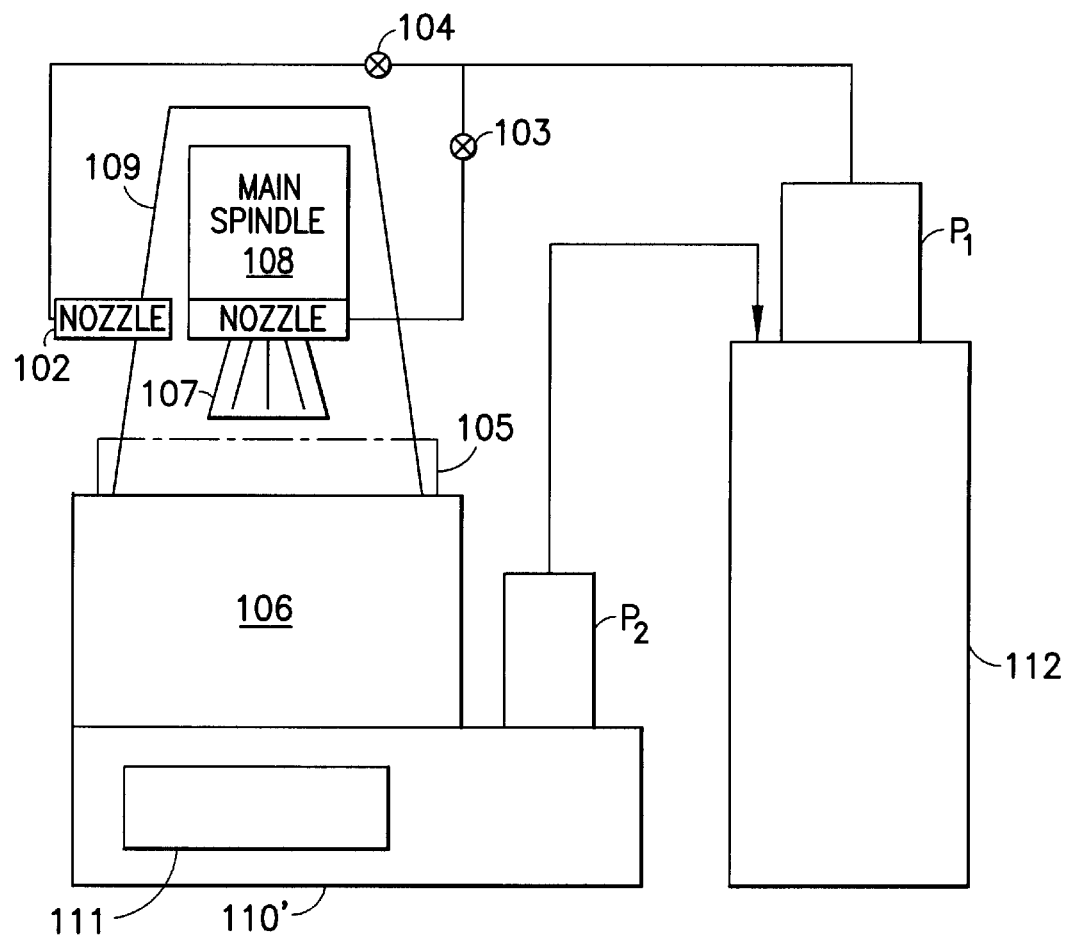
FIG. 11 is a diagrammatic showing a second installation example embodying the basic constructional principle of the invention.
Figure 12:
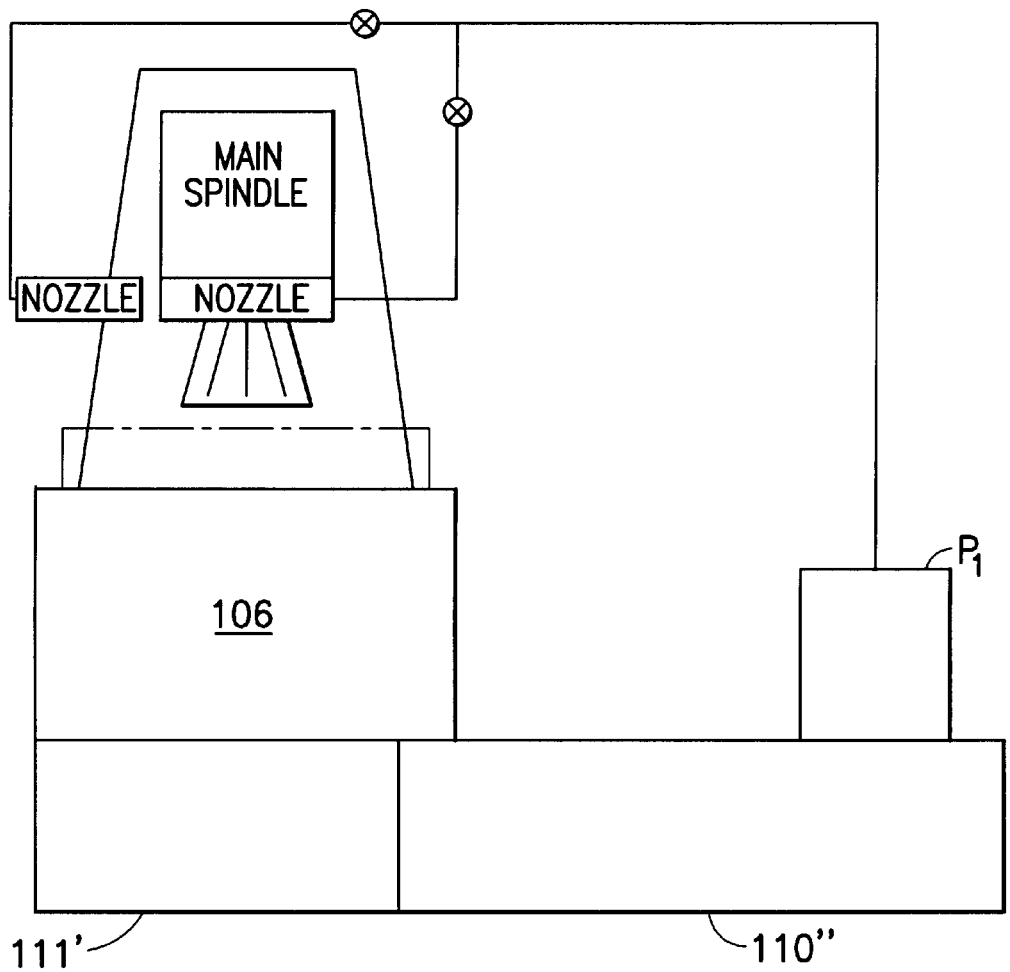
FIG. 12 is a diagrammatic view showing a third installation example embodying the basic constructional principle of the invention.

FIGS. 10 through 12 show three installation examples embodying the basic constructional principle of the present invention. A first embodiment has a liquid tank arrangement different from the basic arrangement shown in FIG. 1, wherein a coolant liquid preferably containing air bubbles are fed from a coolant pump P1 installed directly on a separating and recovering tank 101 into said annular nozzle 3 and an auxiliary nozzle 102 of conventional type respectively through flow control valves 103 and 104. The numeral 105 denotes a workpiece; 106 denotes a machine body; 107 denotes a milling tool for milling machines; 108 denotes a main spindle; and 109 denotes a column, and the tank 110 disposed immediately below the machine body 106 is not gutter-shaped; it is a sealed type large-capacity tank, which plays the roles of both a direct recovery tank and a main tank for coolant liquid, and a second coolant pump P2 is installed thereon.

In a second embodiment shown in FIG. 11, a separating and recovering section 111 is formed within a tank 110' disposed below a machine body 106, and a recovered coolant liquid drawn therefrom by a coolant pump P2 is fed to a large-capacity preparatory tank 112 and is directed to the region under machining, the rest of the arrangement being the same as in the first embodiment shown in FIG. 10.

In a third embodiment shown in FIG. 12, a separating and recovering tank 111' itself is disposed immediately below the machine body 106, with a large-capacity tank 110" connected thereto, and a single coolant pump P1 alone is used to feed a coolant liquid, the rest of the arrangement being the same as in the embodiments shown in FIGS. 10 and 11.

Figure 13:
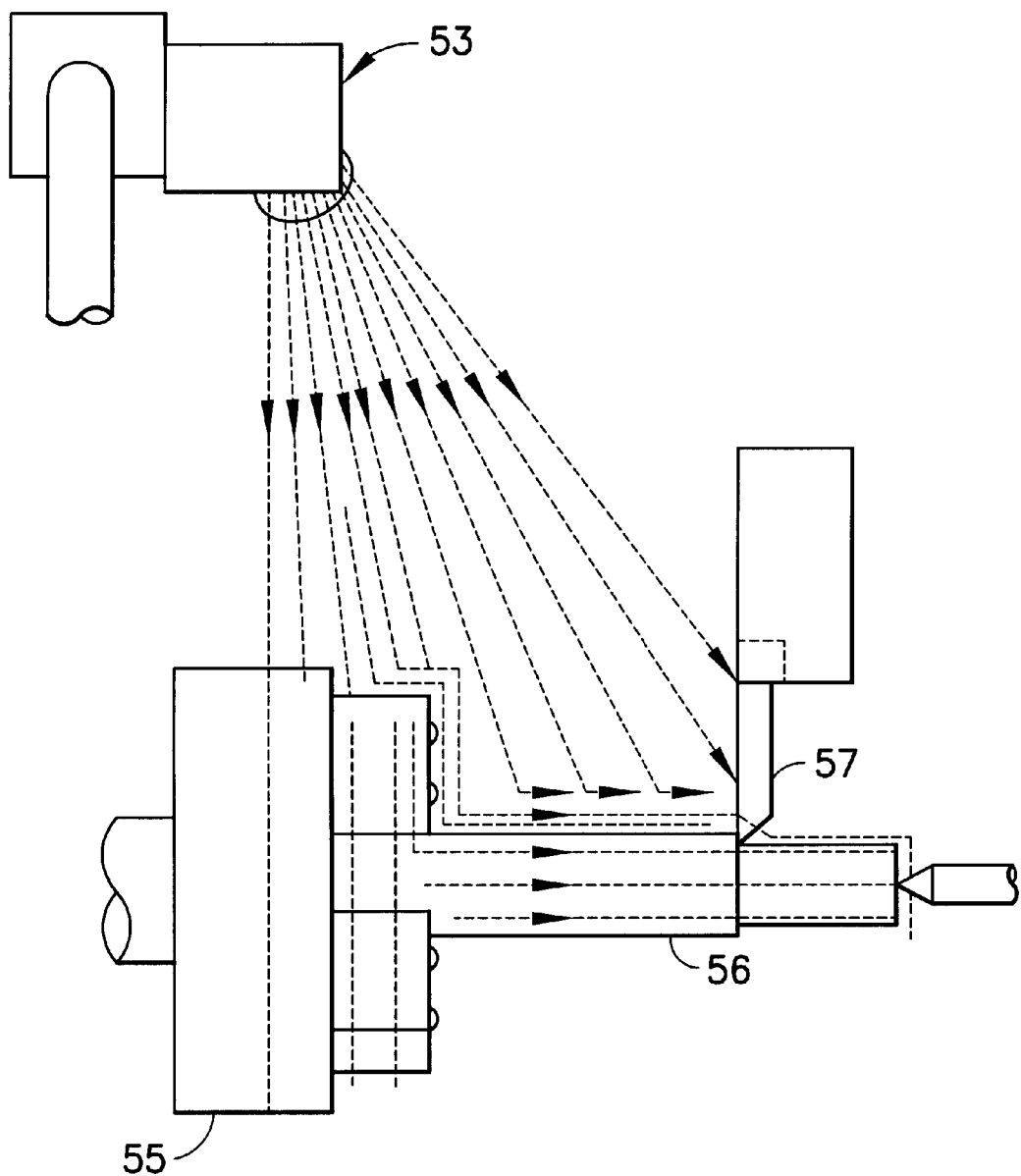
FIG. 13 is a diagrammatic side view showing the outline of another constructional principle concerning the coolant liquid supply of the invention.

FIG. 13 is a diagrammatic side view showing another arrangement for feeding a coolant liquid according to the invention. In a lathe shown in FIG. 13, a coolant liquid nozzle 53 spouts a turbulent coolant liquid containing air bubbles from its lower end nozzle port of rectangular cross section over a region extending from the upper peripheral portion of a workpiece gripping chuck 55 axially to a workpiece 56 and at least a cutting tool 57. The coolant liquid impinging on the chuck 55, the peripheral surface of the workpiece 56 and the cutting tool 57 forms a flowing film attached to the rotating peripheral surface with the presence of its turbulent flow and air bubbles preventing the cooling liquid from being splashed, the coolant liquid being affluently fed to the region of contact between the cutting tool 57 and the workpiece 56. In this system also, the same effect of lubricating and cooling the contact region as in the case of the nozzle shown in FIGS. 1 through 5. Further, if cutting continues according to this system, the coolant liquid jet flow from the nozzle 53 impinges on the tool rest located above the cutting tool 57, so that the coolant liquid is more satisfactorily fed to said contact region.

Figure 14:
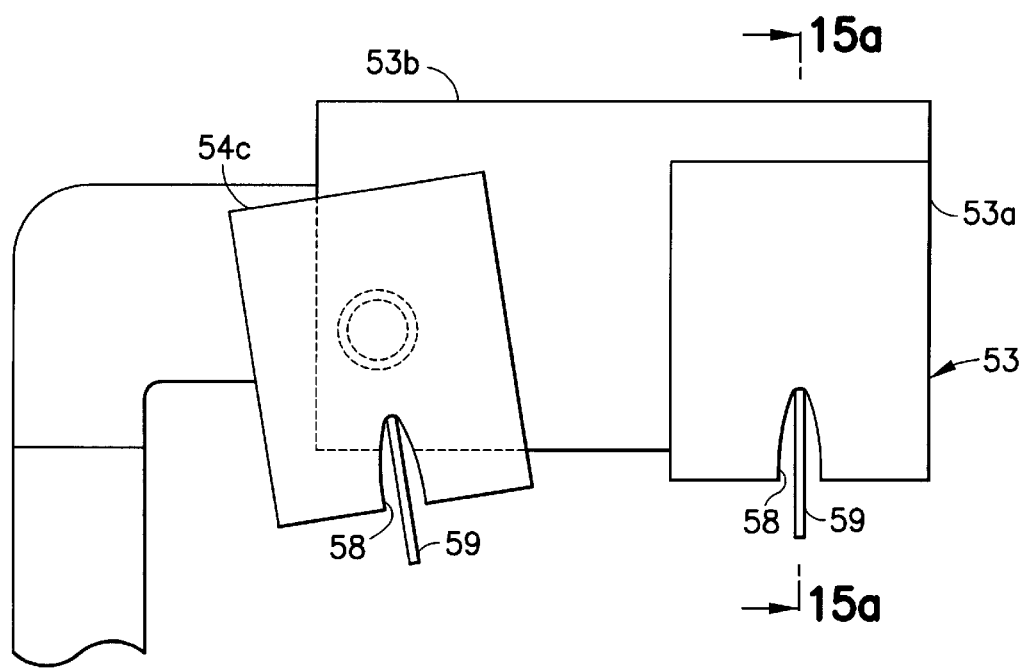
FIG. 14 is a plan view of a coolant liquid feeding nozzle used in the arrangement shown in FIG. 13.
Figure 15A:
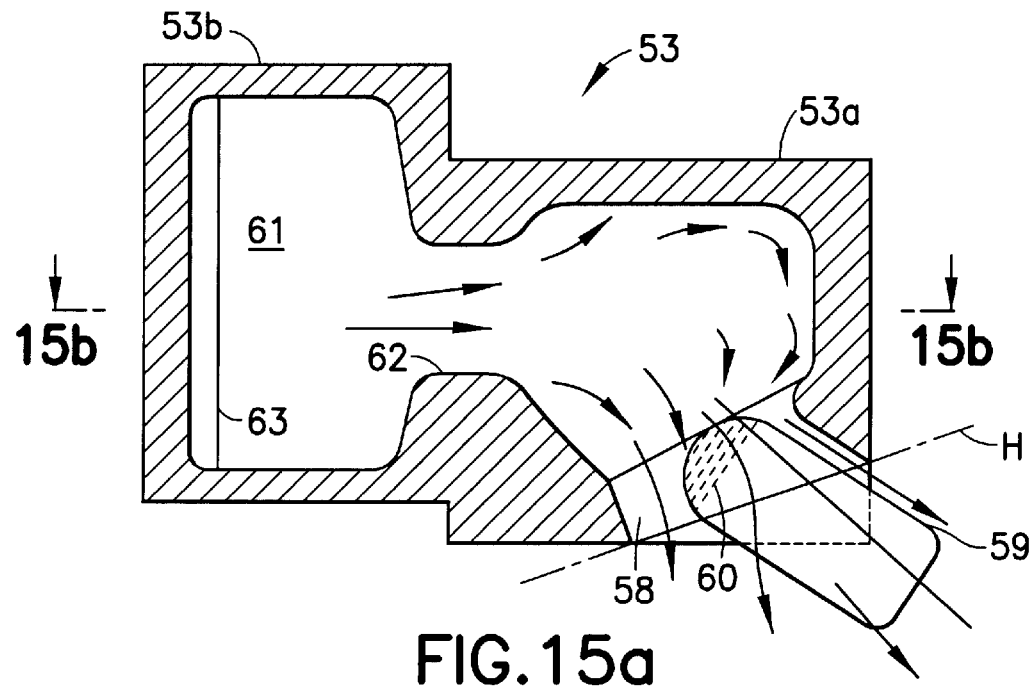
FIG. 15a is a vertical sectional view of a fixed nozzle taken along the line 15A—15A in FIG. 14.
Figure 15B:
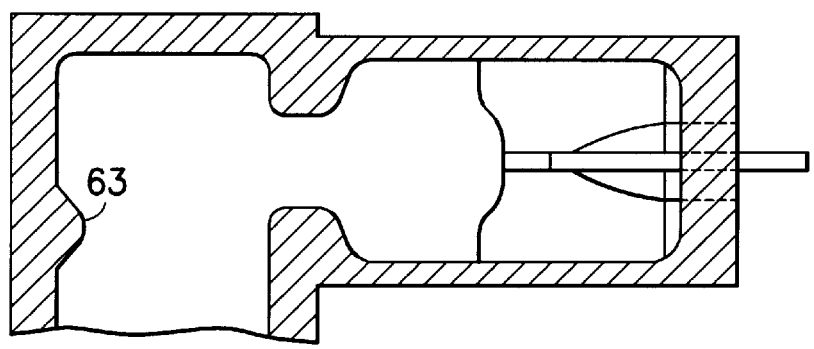
FIG. 15b is a partial sectional plan view taken along the line 15B—15B therein.
Figure 16:
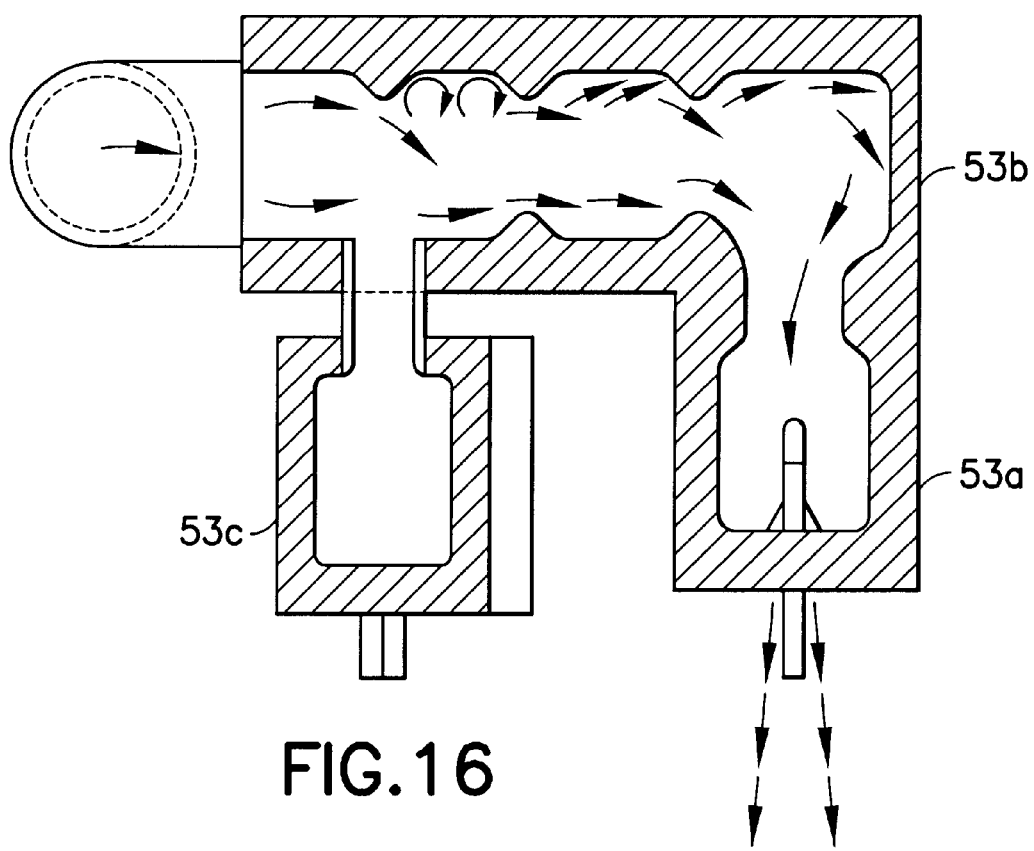
FIG. 16 is a sectional plan view showing the entire construction of the coolant liquid feeding nozzle shown in FIG. 14.

FIGS. 14 through 16 show the construction of an embodiment of the nozzle 53. The configuration of the nozzle 53 shown in FIG. 13 shows the relation between a first nozzle portion 53a and a nozzle body 53b in the right-hand side of FIG. 14. This first nozzle portion 53a and a second nozzle portion 54c both have at their lower end corner a nozzle opening 58 whose outlet section H (FIG. 15) is substantially rectangular, through which nozzle opening a coolant liquid is spouted downward as seen in FIGS. 13 through 15(a). The numeral 59 denotes a vibrating element or tongue element of metal having substantial rigidity or elasticity inserted in the nozzle opening 58 is adapted to vibrate or form a flow resistance in order to cause air bubbles to form in the spouted coolant liquid during the spouting of the latter. This vibrating element 59, as shown in FIG. 15, is fixed only at its upper end region 60 to the wall surface of the nozzle opening 58, allowing the coolant liquid to flow therearound. A cross section of the nozzle opening 58 as seen from the outside is rectangular, as described above, and its interior is an inlet chamber for coolant liquid, said inlet chamber communicating with a coolant liquid receiving port 61 in the main body 53b which is integral with the first nozzle portion 53a. A communication port 62 leading to the receiving port 61 serves as a turbulent flow forming section is constricted to have a smaller cross section than the pertinent cross-sectional area of the inlet chamber and the receiving inlet, so that the coolant liquid flowing into the receiving port 61 passes through this turbulent flow forming section whereby it flows from the inlet chamber into the nozzle opening 58 as a collection of particulated turbulent flows. The turbulent flow forming section 62, as shown in FIG. 15(b), has constricted shape through out its periphery, so that the coolant liquid flowing into the receiving port 61 first impinges on the back ridge 63 of the main body to form a turbulent flow and is then throttled in the constricted portion 62, whereby it is discharged trough the nozzle opening as a collection of particulate turbulent flows as described above.

As shown in FIGS. 14 and 16, the second nozzle portion 53c is angularly adjustable with respect to the main body portion 53b and the angle between the planes including the vibrating plates 59 of the two nozzles can be changed to adjust the spouting in such a manner as to, e.g., spout the coolant liquid at right angles against the peripheral surface of the chuck positioned below the nozzle 53 disposed at the fixed position on the machine.

Figure 17:
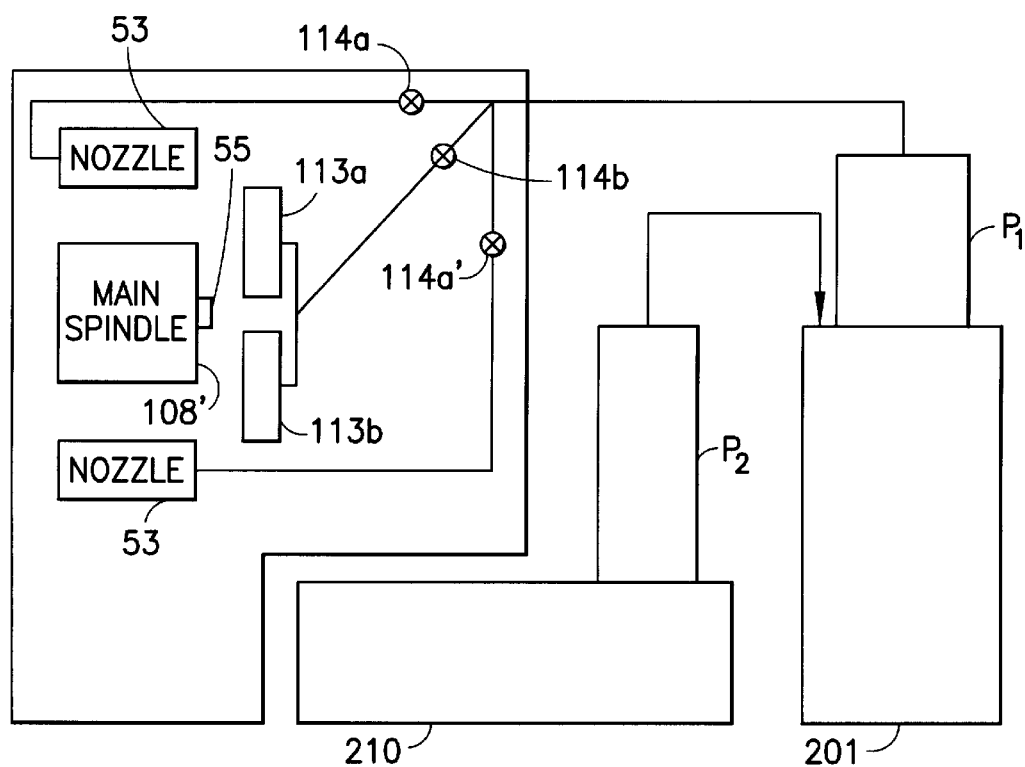
FIG. 17 is a sectional plan view showing a fourth installation example embodying said another constructional principle shown in FIG. 13.
Figure 18:
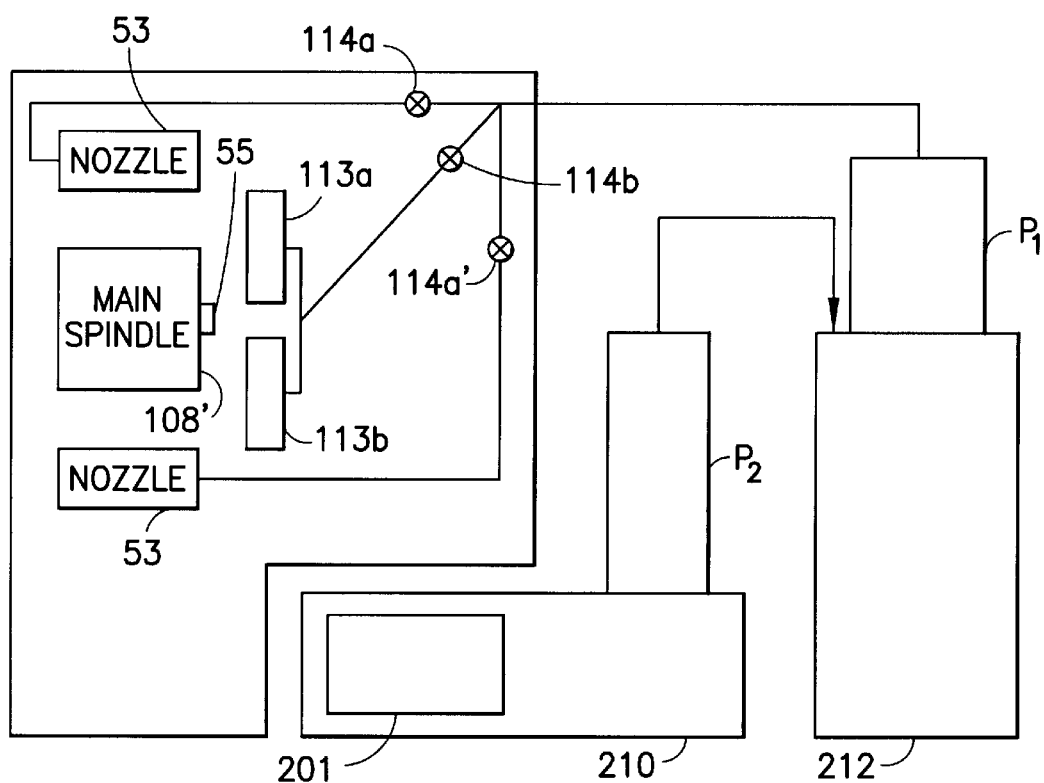
FIG. 18 is a sectional plan view showing a fifth installation example embodying said another constructional principle shown in FIG. 13.
Figure 19:
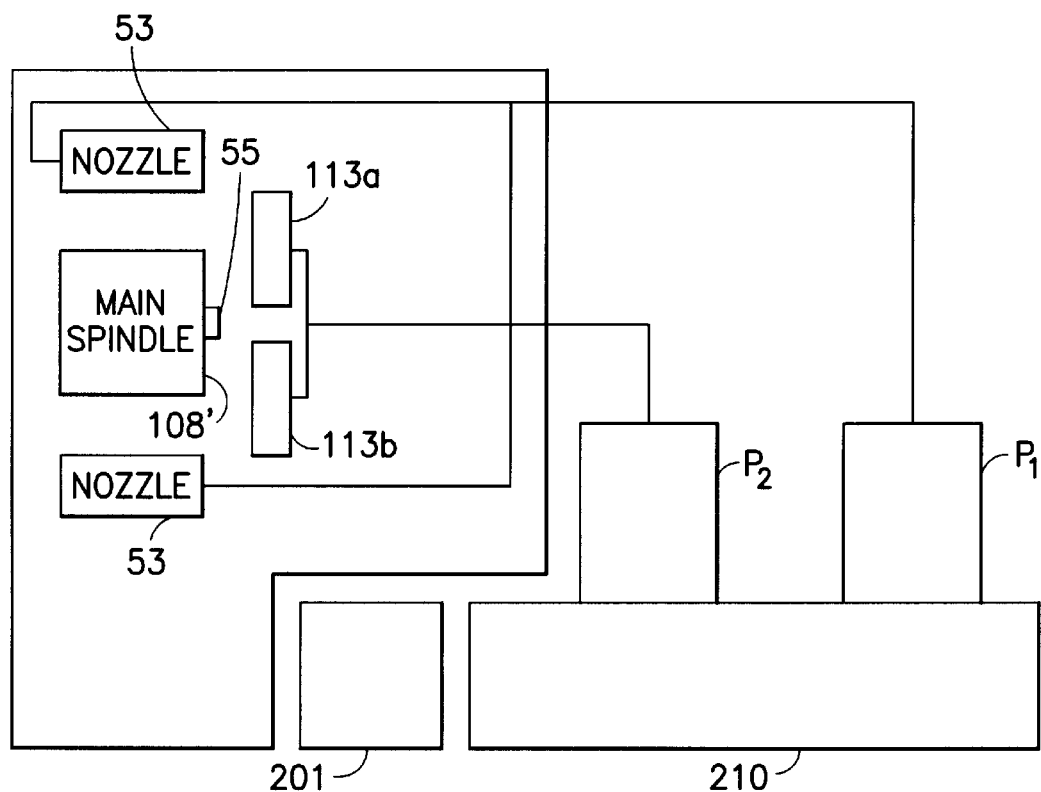
FIG. 19 is a sectional plan view showing a sixth installation example embodying said another constructional principle shown in FIG. 13.

FIGS. 17 through 19 show three installation examples using this second nozzle construction, wherein in each case, two nozzles 53 are installed for two tool rests, and there are channels for feeding a coolant liquid directly to these tool rests 113a and 113b, with flow control valves 114a, 114a' and 114b placed therein. Herein, 108' denotes a main spindle; 201 denotes a separating and recovering tank; 210 denotes a main tank; and 212 denotes a preparatory tank. The rest of the arrangement, as long as the one shown in FIG. 17 is concerned, is the same as the first embodiment concerning the first constructional principle shown in FIG. 10.

The embodiments shown in FIGS. 18 and 19 have the same nozzle channels and tool rest feeding channels as in FIG. 17, the rest of the arrangement being constructed in the same manner as in the second and third embodiments concerning the first constructional principle shown in FIGS. 11 and 12.

EXAMPLES OF MACHINING USING THE INVENTIVE SYSTEM

It has been confirmed that the use of the system using the basic constructional principle of the present invention provides a sharp reduction in the total cost of the cutting and milling of machine parts and a high machining precision. That is, it has been found that remarkable improvements in cooling performance and lubricating performance enable high speed high feed rate machining of thin iron sheets, which would otherwise easily warp, by using a fullback cutter.

For example, a 12 mm thick, 1212 mm wide, 2424 mm long, SS400 plate which was generally considered difficult to cut was successfully cut with a main spindle horse power of 15 KW/h, a cutter diameter of 200 mm, a cutting depth of 1.3 mm, a cutting rate of 500 mm/min, and a cutting feed rate of 3,000 mm/min to 5,000 mm/min. As for the tool to be used, it is also possible to use a commercially available non-coat tip.

If a commercially available coated tip is used, a commercially available non-annealed black-skin iron plate which was 12 mm thick×1212 mm×2424 mm was cut with a main spindle horse power of 15 KW/h, a cutting depth of 1.7 mm, a cutting rate of 400 mm/min, and a cutting feed rate of 3,650 mm/min, and even if a fullback cutter was used, it was possible to keep down the warp to within 0.1 mm. Subsequent to the rough cutting, if the warp is removed and final finishing is effected by using a flat drag-equipped fullback cutter for finishing, it becomes possible to increase productivity.

The coolant liquid feeding nozzle does not require adjusting even if the tool length is changed in order not to allow the coolant liquid to flow directly to the cutting point. This is very effective for a machine, like a machining center, which always uses tools of different lengths.

Since the coolant liquid flows to the cutting point in close contact with and along the workpiece surface, the same effect can be attained not only in a fullback cutter but also in a drill, endmill, tap and boring operation.

INDUSTRIAL APPLICABILITY

The present invention, in the arrangement described above, provides a method of preparing a coolant liquid containing air bubbles superior in lubrication and cooling, a nozzle feeding system for producing an affluent supply of coolant liquid to the cutting point, and a coolant liquid recycling system superior in a foreign matter separating function, thereby enabling high precision cutting or milling by feeding such coolant liquid. The machining rate can be increased to 1.5–3 times and hence the resulting economic effect is very high. Further, since a great reduction in the cutting oil cost and in the tank cleaning cost can be expected, there are provided far-reaching effects in efficiency improvement, the easing of environmental pollution, labor saving, etc. Further, as a coolant liquid, in some cases, water and a rust-preventive agent alone may be used to effect cutting.

An English translation of the amended claims which was submitted under PCT Article 19(1)

What is claimed is:

1. A method for feeding a coolant liquid to a cutting machine or grinding machine, which is characterized by installing an annular nozzle for coolant liquid above a milling tool or grinding tool connected to a vertical main spindle so that it faces downward at a substantially coaxial position, the inner wall of said nozzle which extends to its discharge port being formed with a curved surface and a twist channel for producing a turbulent flow, whereby the coolant liquid being fed is discharged downward through said discharge port generally as a spiral flow which is a collection of particulate turbulent flows, thereby forming a cylindrical veil of spiral flow of coolant liquid which surrounds said milling tool or grinding tool and whose lower end reaches the surface of the workpiece, at least a part of said spiral flow being caused to move from the lower end of said cylindrical veil along the surface of the workpiece in a whirl toward the central region until it is fed to the region under machining which is in contact with the milling tool or grinding tool, the at least a part of said spiral flow being discharged outside said cylindrical veil together with chips and heat of friction and diffused along the workpiece surface.

2. A method as set forth in claim 1, which is characterized in that air bubbles are caused to form continuously in the coolant liquid being fed to said cylindrical nozzle.

3. An annular nozzle for downwardly discharging coolant liquid adapted to be installed above and coaxial with a milling tool or grinding tool connected to a vertical main spindle, said nozzle comprising:

a) an inlet annulus defining an annular inlet chamber, b) a channel annulus disposed axially adjacent said annular inlet chamber, including at least two introducing passages communicating with said inlet chamber at axisymmetrical positions, outward or inward twist channels respectively communicating with said introducing passages and twisted in a unified direction, and annular turbulent flow forming portions communicating with the terminal ends of said twist channels, and c) nozzle annulus communicating with all annular area of said turbulent flow forming portions in said channel annulus and defining an annular nozzle space which opens in a downward and inward or outward direction, d) wherein the channel wall extending from said turbulent flow forming portions in said channel annulus to said nozzle space is formed with at least one bent surface radially bent back for formation of turbulent flow, whereby the coolant liquid fed is discharged from said nozzle space generally as a spiral flow which is a collection of particulate turbulent flows, forming a substantially cylindrical veil which consists of said spiral flow and which surrounds said milling tool or grinding tool.

4. A separating and recovering apparatus for coolant liquid in a cutting machine or grinding machine for collecting a coolant liquid fed to a region under machining and separating impurities therefrom and then discharging it, said separating and recovering apparatus comprising:

a) an inflow tank for receiving a coolant liquid after the coolant liquid has been used;

b) at least a first set of two connected tanks either downstream or incorporated within said inflow tank, wherein a sleeve bundle having a substantially honeycomb-like cross section and extending through a partition wall between said first set of two connected tanks is disposed extending from an upstream tank of said first set of tanks to a downstream tank of said first set of tanks and facing somewhat upward;

c) at least a second set of two connected tanks either downstream or incorporated within said inflow tank, wherein a communication port is formed in a partition wall between said second set of two connected tanks, said port having a lower end portion disposed at a slightly higher level than that of the bottom of the second set of tanks and an upper end portion disposed at a lower level than the normal liquid level preset to a final overflow level;

d) an outflow tank which is a final tank connected either through a sleeve bundle or an opening to the most downstream tank in a plurality of series connected tanks comprising a combination of said first set of tanks and said second set of tanks, said outflow tank having an overflow port for discharging the separated and recovered coolant liquid at said final overflow level;

e) a foreign matter separating roller including a rotatable roller having a horizontal axis installed in at least one of the plurality of tanks ranging from said inflow tank to said outflow tank, said roller being partially immersed in the coolant liquid in the at least one tank and combined with a deposit-scraping blade having a front edge opposed to the portion of the roller surface exposed above the liquid level, with a very narrow clearance defined between the exposed portion of the roller surface and said blade; and f) wherein the upward slope of said sleeve bundle is defined such that masses of air bubbles, having foreign matters adhering thereto, in the coolant liquid flowing from a low-level inlet in said sleeve bundle in the upstream tank of said first set of tanks are caused by the action of buoyancy to abut against the respective ceiling surfaces of the sleeves and while these masses of air bubbles are staying in the sleeves, they are integrated with subsequent masses to become increased in size, whereby said masses are pushed by the liquid flowing into the sleeves to move to a high-level outlet in the ceiling surface, said masses being discharged from said outlet into the coolant liquid phase in the downstream tank of said first set of tanks and finally surfacing.

5. An apparatus as set forth in claim 4, characterized in that on the bottom of each tank of said first set of tanks, a heater for heating said sleeve bundle extending through said partition wall between the two tanks is provided.

6. An apparatus as set forth in claim 4, characterized in that in the downstream tank in said first set of tanks with said sleeve bundle extending through said partition wall therebetween, there are installed a foreign matter arresting belt having a vertical ascending surface opposed to the high-level outlet in said sleeve bundle and a vertical descending surface turned back from the upper end of said vertical ascending surface projecting above the liquid surface, and a blade opposed to said vertical descending surface extending from the upper end of said belt to the liquid surface for scraping foreign matters adhering to the belt.

7. A method of feeding a coolant liquid for a lathe, comprising the steps of positioning a nozzle above the work holding chuck of the lathe, said nozzle including discharge port of substantially rectangular cross section and a constricted curved surface portion on its inner wall extending to said discharge port for producing a turbulent flow, and also including a loosely mounted tongue piece of rigid or elastic material crossing the section of said discharge port and projecting outward, whereby said nozzle is arranged such that a coolant liquid received through the inlet disposed upstream of said constricted curved surface portion is discharged from said discharge port as a collection of particulate turbulent flows containing air bubbles drawn into the coolant liquid as the coolant liquid passes by said tongue piece, said cross section of the discharge port of said substantially rectangular section being disposed substantially orthogonal to the plane containing the main axis of the lathe and facing obliquely downward deviated in the direction in which the workpiece projects, whereby the coolant liquid discharged from said nozzle is caused to impinge on a region axially extending from the top of the peripheral surface of said chuck to at least the region under machining, so as to form turbulent flow film of coolant liquid containing air bubbles surrounding the chuck and the peripheral surface of the workpiece, at least part of said turbulent flow containing air bubbles being caused to move along the chuck surface and workpiece surface so as to be fed to the region under machining which is in contact with the cutter and then flow out toward the coolant liquid recovery channel together with chips and heat of friction.

8. A method as set forth in claim 7, characterized in that two nozzles having a discharge port having said substantially rectangular cross section are disposed side by side, and turbulent flow of said coolant liquid containing air bubbles is caused to impinge on the peripheral surface of said chuck as two adjacent parallel discharge flows.

9. A coolant liquid feeding nozzle for a lathe comprising:
at least one nozzle having a discharge port of substantially rectangular section and having a tongue piece of rigid or elastic material crossing the setion of said discharge port and projecting outside, said discharge port and projecting outside, said tongue piece being loosely mounted in said discharge port
a main body having a feed chamber communicating with said at least one nozzle, and a coolant receiving inlet in said feed chamber,
the inner wall of the feed chamber extending from said receiving port to said discharge port and the inner wall of the nozzle being formed with a constricted curved surface portion, whereby the coolant liquid received from said receiving port is discharged from said discharge port as a collection of particulate turbulent flows containing air bubbles drawn into the coolant liquid as the coolant liquid passes by said tongue piece, the discharge flow of this coolant liquid being cause to impinge on the rotating peripheral surface continuous with the region under machining which is in contact with the cutter and also impinge on the cutter to form a turbulent flow film containing air bubbles, at least part of said turbulent flow film containing air bubbles moving along the rotating peripheral surface and cutter until it is fed to said region under machining.

10. A nozzle as set forth in claim 9, characterized in that two said nozzles are disposed side by side, one nozzle being fixed to said main body, the other being angularly adjustably connected to said main body, whereby two discharge flows of coolant liquid from said two nozzles are caused to impinge on said rotating peripheral surface at substantially right angles therewith.

\* \* \* \* \*